United States Patent
Kruppa

(10) Patent No.: US 8,150,163 B2
(45) Date of Patent: Apr. 3, 2012

(54) SYSTEM AND METHOD FOR RECOVERING IMAGE DETAIL FROM MULTIPLE IMAGE FRAMES IN REAL-TIME

(75) Inventor: Hannes Martin Kruppa, New York, NY (US)

(73) Assignee: Scanbuy, Inc., New York, NY (US)

( * ) Notice: Subject to any disclaimer, the term of this patent is extended or adjusted under 35 U.S.C. 154(b) by 959 days.

(21) Appl. No.: 11/734,173

(22) Filed: Apr. 11, 2007

(65) Prior Publication Data

US 2007/0242883 A1 Oct. 18, 2007

Related U.S. Application Data

(60) Provisional application No. 60/791,391, filed on Apr. 12, 2006.

(51) Int. Cl.
*G06K 9/46* (2006.01)
(52) U.S. Cl. ........ 382/190; 382/193; 382/195; 382/272; 382/312; 235/462.01; 235/462.02; 235/462.08; 235/462.12
(58) Field of Classification Search ................... 382/190, 382/193, 195, 270–273, 312–313; 235/460.01–460.16
See application file for complete search history.

(56) References Cited

U.S. PATENT DOCUMENTS

| | | |
|---|---|---|
| 4,238,768 A | 12/1980 | Mitsuya et al. |
| 4,323,973 A | 4/1982 | Greenfield |
| 4,554,593 A | 11/1985 | Fox et al. |
| 4,578,766 A | 3/1986 | Caddy |
| 4,692,603 A | 9/1987 | Brass et al. |
| 4,728,783 A | 3/1988 | Brass et al. |
| 4,754,127 A | 6/1988 | Brass et al. |
| 4,774,569 A | 9/1988 | Morton et al. |
| 4,782,221 A | 11/1988 | Brass et al. |
| 4,798,943 A * | 1/1989 | Cherry ..................... 235/462.27 |

(Continued)

FOREIGN PATENT DOCUMENTS

JP 2000-057250 2/2000

(Continued)

OTHER PUBLICATIONS

Bottller, Stefan, "SMS-Flaschenpost erreicht Millionen," W&V Wochenmagazin Fur Marketing, Werbung, Medien und E-Business, Nov. 28, 2003, pp. 44-45.

(Continued)

*Primary Examiner* — Jayesh A Patel
(74) *Attorney, Agent, or Firm* — Wilmer Cutler Pickering Hale and Dorr LLP

(57) ABSTRACT

This invention describes an efficient super-resolution method for image enhancement that leverages prior knowledge about the specific task for which detail information is recovered. The particular case of barcode scanning is considered. The barcode localization and decoding algorithm of the present invention employs a subpixel-accurate search algorithm which allows for estimating barcode bit values at a higher resolution than that available in the image data itself. It thus allows for the synthesis of image detail from multiple frames with the result containing more detail than any of the input frames. For efficiency, it leverages special properties of the quadrilateral target object as well as prior knowledge about constant patterns in the barcodes of interest. This allows for real-time software implementations on portable devices such as camera-equipped cell phones where super-resolution helps to overcome some of the typical camera resolution and processing power constraints.

5 Claims, 15 Drawing Sheets

U.S. PATENT DOCUMENTS

| | | | |
|---|---|---|---|
| 4,874,936 A | 10/1989 | Chandler et al. | |
| 4,896,029 A | 1/1990 | Chandler et al. | |
| 4,948,955 A * | 8/1990 | Lee et al. | 235/462.08 |
| 4,969,202 A | 11/1990 | Groezinger | |
| 4,998,010 A | 3/1991 | Chandler et al. | |
| 5,016,118 A | 5/1991 | Nannichi | |
| 5,073,954 A * | 12/1991 | Van Tyne et al. | 235/462.08 |
| 5,103,490 A | 4/1992 | McMillin | |
| 5,113,454 A | 5/1992 | Marcantonio et al. | |
| 5,120,940 A * | 6/1992 | Willsie | 235/462.08 |
| 5,153,418 A | 10/1992 | Batterman et al. | |
| 5,179,599 A | 1/1993 | Formanek | |
| 5,189,292 A | 2/1993 | Batterman et al. | |
| 5,223,701 A | 6/1993 | Batterman et al. | |
| 5,235,172 A | 8/1993 | Oehlmann | |
| 5,243,443 A | 9/1993 | Eschbach | |
| 5,243,444 A | 9/1993 | Fan | |
| 5,243,655 A | 9/1993 | Wang | |
| 5,276,315 A | 1/1994 | Surka | |
| 5,287,275 A * | 2/1994 | Kimura | 1/1 |
| 5,311,001 A * | 5/1994 | Joseph et al. | 235/462.07 |
| 5,327,240 A | 7/1994 | Golston et al. | |
| 5,331,442 A | 7/1994 | Sorimachi | |
| 5,345,317 A | 9/1994 | Katsuno et al. | |
| 5,424,524 A | 6/1995 | Ruppert et al. | |
| 5,510,604 A | 4/1996 | England | |
| 5,621,203 A | 4/1997 | Swartz et al. | |
| 5,642,485 A | 6/1997 | Deaton et al. | |
| 5,664,110 A | 9/1997 | Green et al. | |
| 5,691,773 A | 11/1997 | Wang et al. | |
| 5,694,481 A * | 12/1997 | Lam et al. | 382/145 |
| 5,696,325 A * | 12/1997 | Coucke et al. | 73/595 |
| 5,767,978 A | 6/1998 | Revankar et al. | |
| 5,774,874 A | 6/1998 | Veeneman et al. | |
| 5,778,092 A | 7/1998 | MacLeod et al. | |
| 5,783,811 A | 7/1998 | Feng et al. | |
| 5,811,781 A | 9/1998 | Ackley | |
| 5,825,947 A * | 10/1998 | Sasaki et al. | 382/321 |
| 5,852,677 A | 12/1998 | Nakamura et al. | |
| 5,862,270 A | 1/1999 | Lopresti et al. | |
| 5,877,486 A | 3/1999 | Maltsev et al. | |
| 5,890,021 A | 3/1999 | Onoda | |
| 5,901,246 A * | 5/1999 | Hoffberg et al. | 382/209 |
| 5,909,505 A | 6/1999 | Katayama et al. | |
| 5,915,039 A | 6/1999 | Lorie et al. | |
| 5,963,669 A | 10/1999 | Wesolkowski et al. | |
| 5,969,325 A | 10/1999 | Hecht et al. | |
| 6,045,515 A | 4/2000 | Lawton | |
| 6,061,057 A | 5/2000 | Knowlton et al. | |
| 6,082,619 A * | 7/2000 | Ma et al. | 235/462.1 |
| 6,088,482 A * | 7/2000 | He et al. | 382/202 |
| 6,091,511 A | 7/2000 | Ben Dror et al. | |
| 6,101,285 A | 8/2000 | Fan | |
| 6,115,488 A | 9/2000 | Rogers et al. | |
| 6,115,508 A | 9/2000 | Lopresti et al. | |
| 6,129,278 A * | 10/2000 | Wang et al. | 235/462.01 |
| 6,137,898 A | 10/2000 | Broussard et al. | |
| 6,144,848 A | 11/2000 | Walsh et al. | |
| 6,164,540 A * | 12/2000 | Bridgelall et al. | 235/462.01 |
| 6,167,383 A | 12/2000 | Henson | |
| 6,170,749 B1 * | 1/2001 | Goren et al. | 235/462.06 |
| 6,199,099 B1 | 3/2001 | Gershman et al. | |
| 6,201,612 B1 | 3/2001 | Matsushiro et al. | |
| 6,201,901 B1 | 3/2001 | Zhou et al. | |
| 6,249,773 B1 | 6/2001 | Allard et al. | |
| 6,282,307 B1 | 8/2001 | Armato, III et al. | |
| 6,347,156 B1 | 2/2002 | Kamada et al. | |
| 6,366,696 B1 | 4/2002 | Hertz et al. | |
| 6,371,373 B1 * | 4/2002 | Ma et al. | 235/462.1 |
| 6,418,244 B2 | 7/2002 | Zhou et al. | |
| 6,431,452 B2 | 8/2002 | Feng | |
| 6,446,868 B1 | 9/2002 | Robertson et al. | |
| 6,512,919 B2 | 1/2003 | Ogasawara | |
| 6,513,714 B1 * | 2/2003 | Davis et al. | 235/462.16 |
| 6,565,003 B1 * | 5/2003 | Ma | 235/462.1 |
| 6,577,861 B2 | 6/2003 | Ogasawara | |
| 6,585,157 B2 | 7/2003 | Brandt et al. | |
| 6,604,682 B2 | 8/2003 | Wakamiya et al. | |
| 6,631,012 B2 | 10/2003 | Athens et al. | |
| 6,631,843 B2 | 10/2003 | Schuessler | |
| 6,641,037 B2 | 11/2003 | Williams | |
| 6,650,766 B1 | 11/2003 | Rogers et al. | |
| 6,651,053 B1 | 11/2003 | Rothschild | |
| 6,674,919 B1 | 1/2004 | Ma et al. | |
| 6,687,345 B1 | 2/2004 | Swartz et al. | |
| 6,687,346 B1 | 2/2004 | Swartz et al. | |
| 6,688,525 B1 * | 2/2004 | Nelson et al. | 235/462.21 |
| 6,714,665 B1 * | 3/2004 | Hanna et al. | 382/117 |
| 6,729,544 B2 * | 5/2004 | Navon | 235/462.14 |
| 6,735,341 B1 | 5/2004 | Horie et al. | |
| 6,735,745 B2 | 5/2004 | Sarig | |
| 6,751,352 B1 * | 6/2004 | Baharav et al. | 382/183 |
| 6,752,317 B2 | 6/2004 | Dymetman et al. | |
| 6,802,450 B2 | 10/2004 | Cheung et al. | |
| 6,832,729 B1 | 12/2004 | Perry et al. | |
| 6,837,432 B2 | 1/2005 | Tsikos et al. | |
| 6,850,901 B1 | 2/2005 | Hunter et al. | |
| 6,898,329 B1 | 5/2005 | Takahashi | |
| 6,915,103 B2 | 7/2005 | Blume | |
| 6,961,465 B2 * | 11/2005 | Shah | 382/181 |
| 6,970,837 B1 | 11/2005 | Walker et al. | |
| 7,007,852 B2 * | 3/2006 | Silverbrook et al. | 235/487 |
| 7,010,501 B1 | 3/2006 | Roslak et al. | |
| 7,077,317 B2 * | 7/2006 | Longacre et al. | 235/454 |
| 7,113,627 B1 * | 9/2006 | Cahill et al. | 382/141 |
| 7,124,949 B2 * | 10/2006 | Madej | 235/462.16 |
| 7,156,311 B2 * | 1/2007 | Attia et al. | 235/462.46 |
| 7,172,124 B2 * | 2/2007 | Wang et al. | 235/462.16 |
| 7,225,518 B2 | 6/2007 | Eidenschink et al. | |
| 7,234,645 B2 * | 6/2007 | Silverbrook et al. | 235/494 |
| 7,242,816 B2 | 7/2007 | Attia et al. | |
| 7,245,780 B2 | 7/2007 | Attia et al. | |
| 7,284,701 B2 | 10/2007 | Silverbrook et al. | |
| 7,287,696 B2 * | 10/2007 | Attia et al. | 235/462.01 |
| 7,296,747 B2 | 11/2007 | Rohs | |
| 7,309,015 B2 | 12/2007 | Frantz et al. | |
| 7,313,759 B2 | 12/2007 | Sinisi | |
| 7,334,728 B2 | 2/2008 | Williams | |
| 7,387,250 B2 | 6/2008 | Muni | |
| 7,427,028 B2 * | 9/2008 | Nadabar | 235/462.1 |
| 7,516,899 B2 | 4/2009 | Laser | |
| 7,523,864 B2 * | 4/2009 | Manheim | 235/462.01 |
| 7,543,747 B2 * | 6/2009 | Ehrhart | 235/454 |
| 7,556,198 B2 * | 7/2009 | Fabian et al. | 235/462.25 |
| 7,571,856 B2 | 8/2009 | Lo | |
| 7,599,855 B2 | 10/2009 | Sussman | |
| 7,628,331 B2 * | 12/2009 | Madej | 235/462.32 |
| 7,702,162 B2 * | 4/2010 | Cheong et al. | 382/232 |
| 7,726,571 B2 * | 6/2010 | Madej | 235/462.01 |
| 7,946,492 B2 | 5/2011 | Rohs | |
| 2001/0032252 A1 | 10/2001 | Durst et al. | |
| 2001/0041581 A1 | 11/2001 | Hansson | |
| 2001/0051901 A1 | 12/2001 | Hager et al. | |
| 2002/0016750 A1 | 2/2002 | Attia | |
| 2002/0049637 A1 | 4/2002 | Harman et al. | |
| 2002/0050526 A1 | 5/2002 | Swartz et al. | |
| 2002/0060246 A1 | 5/2002 | Gobburu et al. | |
| 2002/0062251 A1 | 5/2002 | Anandan et al. | |
| 2002/0065728 A1 | 5/2002 | Ogasawara | |
| 2002/0071076 A1 | 6/2002 | Webb et al. | |
| 2002/0084330 A1 * | 7/2002 | Chiu | 235/462.11 |
| 2002/0090107 A1 | 7/2002 | Acharya et al. | |
| 2002/0102966 A1 | 8/2002 | Lev et al. | |
| 2002/0104884 A1 | 8/2002 | Meier et al. | |
| 2002/0161658 A1 | 10/2002 | Sussman | |
| 2002/0187774 A1 | 12/2002 | Ritter et al. | |
| 2003/0007696 A1 | 1/2003 | Saito | |
| 2003/0055675 A1 | 3/2003 | Klein Twennaar | |
| 2003/0065738 A1 | 4/2003 | Yang et al. | |
| 2003/0074286 A1 | 4/2003 | Rodrigo | |
| 2003/0111531 A1 | 6/2003 | Williams | |
| 2003/0123710 A1 | 7/2003 | Nakazawa et al. | |
| 2003/0132298 A1 | 7/2003 | Swartz et al. | |
| 2003/0154135 A1 | 8/2003 | Covington et al. | |
| 2003/0230630 A1 | 12/2003 | Whipple et al. | |
| 2004/0004128 A1 * | 1/2004 | Pettinelli et al. | 235/462.41 |
| 2004/0011872 A1 | 1/2004 | Shimizu | |

| | | | |
|---|---|---|---|
| 2004/0042670 | A1 | 3/2004 | Moroo et al. |
| 2004/0066960 | A1* | 4/2004 | McLaren et al. ............... 382/128 |
| 2004/0101183 | A1 | 5/2004 | Mullick et al. |
| 2004/0129784 | A1* | 7/2004 | Iwaguchi et al. ........ 235/462.16 |
| 2004/0240737 | A1 | 12/2004 | Lim et al. |
| 2005/0035206 | A1 | 2/2005 | Attia et al. |
| 2005/0055281 | A1 | 3/2005 | Williams |
| 2005/0058350 | A1* | 3/2005 | Dugan et al. .................. 382/224 |
| 2005/0091118 | A1 | 4/2005 | Fano |
| 2005/0091124 | A1 | 4/2005 | White |
| 2005/0121521 | A1 | 6/2005 | Ghai et al. |
| 2005/0125301 | A1 | 6/2005 | Muni |
| 2005/0198095 | A1* | 9/2005 | Du et al. ....................... 709/200 |
| 2005/0246196 | A1 | 11/2005 | Frantz et al. |
| 2006/0007261 | A1* | 1/2006 | Silverbrook .................... 347/19 |
| 2006/0011728 | A1 | 1/2006 | Frantz et al. |
| 2006/0138219 | A1 | 6/2006 | Brzezniak et al. |
| 2006/0182311 | A1* | 8/2006 | Lev ............................... 382/103 |
| 2007/0086670 | A1* | 4/2007 | Hayakawa et al. ........... 382/260 |
| 2007/0194123 | A1 | 8/2007 | Frantz et al. |
| 2007/0271235 | A1 | 11/2007 | Frank et al. |
| 2008/0033835 | A1 | 2/2008 | Philyaw |
| 2008/0065509 | A1 | 3/2008 | Williams |
| 2008/0093460 | A1 | 4/2008 | Frantz et al. |
| 2008/0254775 | A1 | 10/2008 | Rohs |

FOREIGN PATENT DOCUMENTS

| | | |
|---|---|---|
| JP | 2000-090187 | 3/2000 |
| JP | 2000-200234 | 7/2000 |
| JP | 2000-309154 | 11/2000 |
| JP | 2003-006623 | 1/2003 |
| JP | 2003-335085 | 11/2003 |
| JP | 2004-054530 | 2/2004 |
| JP | 2004-078896 | 3/2004 |
| WO | WO-03060646 | 7/2003 |
| WO | WO-2005/020140 A2 | 3/2005 |
| WO | WO-2005/062234 A1 | 7/2005 |

OTHER PUBLICATIONS

Heckbert, Paul S., "Fundamentals of Texture Mapping and Image Warping," Department of Electrical Engineering and Computer Science, University of California, Master's Thesis, 1989.

International Search Report issued for corresponding International Patent Application No. PCT/US2005/019178, Jun. 2, 2009.

J.M. White and G.D. Rohner, "Image Thresholding for Optical Character Recognition and Other Applications Requiring Character Image Extraction," IBM J. Res. Develop..., vol. 27, No. 4, Jul. 1983, pp. 400-411.

Lew, Michael S., "Principles of Visual Information Retrieval," State of the Art in Shape Matching, 2001, pp. 87-119.

Lycos and Net Perceptions Launch Unbiased Cross-Merchant Product Recommendation Service, PR Newswire, New York: Nov. 16, 1999, pp. 1-3.

Rohs, Michael et al., "Entry Points into a Smart Campus Environment—Overview of the ETHOC System," Institute for Pervasive Computing Swiss Federal Institute of Technology, ICDCS 2003 Workshops, May 2003.

Supplementary European Search Report issued for corresponding European Patent Application No. 05756209.2, Date Feb. 6, 2009.

Trier, O.D., Jain, A.K., "Goal-Directed Evaluation of Binarization Methods", Pattern Analysis and Machine Intelligence, IEEE Transactions on Dec. 1995, ISSN: 0162-8828.

Tsai, Roger Y., "A Versatile Camera Calibration Technique for High-Accuracy 3D Machine Vision metrology Using Off-the-Shelf TV Cameras and Lenses," IEEE Journal of Robotics and Automation, 1987, RA-3(4):323-344.

U.S. Appl. No. 09/883,933, filed Jun. 20, 2001, Olivier Attia.

Wellner, Pierre D., "Adaptive Thresholding for the DigitalDesk," EuroPARC Technical Report EPC-93-110, 1993, pp. 1-17.

U.S. Appl. No. 61/273,036, filed Jul. 30, 2009.

\* cited by examiner

81

82

83

84

85

86

SYSTEM AND METHOD FOR RECOVERING IMAGE DETAIL FROM MULTIPLE IMAGE FRAMES IN REAL-TIME

CROSS-REFERENCE TO RELATED APPLICATIONS

This application claims priority to U.S. Provisional Application Ser. No. 60/791,391, filed Apr. 12, 2006, which is incorporated by reference herein in its entirety.

BACKGROUND OF THE INVENTION

Digital signal enhancement by means of algorithmic processing can improve signal quality drastically, in particular when multiple independent sensor readings are available. However, when computational resources are very limited, then the algorithms must be tailored to the task to be as time-efficient as possible. The focus here is the computational enhancement of light measurements from optical sensors as found in today's cameras, CCDs, infrared scanners or laser scanners. The accuracy of these measurements largely depends on the sensor's quality which is subject to production requirements like cost, size, power-consumption etc. However, by means of algorithmic processing of the recorded light signals, it is possible to restore detail and to improve on the signal-to-noise ratio. Detail information is particularly crucial if the ultimate goal is recognition, for example the recognition of human faces in digital images (i.e. the identification of individuals), the recognition of letters or characters, or the recognition of an infrared-scanned or photographed barcode.

Algorithmic processing can enhance signal detail but it requires computing resources which again are subject to practical constraints because of production requirements. This is particularly the case for portable devices, such as camera-equipped mobile phones, handheld barcode scanners or handheld digital cameras where computational resources are very limited.

In the particular example of barcode scanning with a camera, a portable device of today is typically limited in terms of available image resolution. Computational methods known as "super-resolution" methods can be employed to remedy this. However, standard super-resolution methods are computationally too complex for portable devices of today, given that the user expects to scan a barcode within a matter of seconds (or even less than 1 second).

Therefore, there clearly exists a need for a new time-efficient algorithm that is able to recover image detail in real-time thus providing a fluent and pleasant user experience even with today's portable devices which have limited computational resources.

SUMMARY OF THE INVENTION

Super-resolution methods can recover image detail by means of signal enhancement. However, current methods are too complex to efficiently run on today's mobile devices such as camera-equipped mobile phones. This invention therefore describes a novel super-resolution method that runs in real-time implemented in software by leveraging prior knowledge about the specific task for which detail information is recovered. The particular case of barcode scanning is described here. The barcode localization and decoding algorithm of the present invention employs an efficient subpixel-accurate search algorithm. It is this subpixel-accurate localization scheme which allows for estimating barcode bit values at a higher resolution than that available in the image data itself. It thus allows for the synthesis of image detail from multiple frames with the result containing more detail than any of the input frames alone. This invention can therefore be categorized as a multi-frame super-resolution computer vision algorithm. For efficiency, it leverages special properties of the quadrilateral target object as well as prior knowledge about constant patterns in the barcodes of interest (e.g. localization patterns, alignment patterns, timing patterns and any other form of barcode template). This allows for real-time implementations on portable devices such as camera-equipped cell phones where super-resolution helps to overcome some of the typical camera resolution and processing power constraints.

Therefore, it is a primary object of the present invention to provide a super-resolution algorithm capable of assisting the decoding of barcodes in real-time.

It is another object of the present invention to provide a super-resolution algorithm specifically tailored to barcode decoding on mobile devices.

It is an additional object of the present invention to provide a sophisticated method for information extraction from a series of images where the synthesized result contains potentially more information than each individual input image.

It is yet another object of the present invention to utilize the inherent structure of barcodes to provide increased efficiency in evaluating barcode images.

It is an additional object of the present invention to provide a super-resolution algorithm which is capable of operating on aliased images.

Other objects, features, and characteristics of the present invention, as well as the methods of operation and functions of the related elements of the structure, and the combination of parts and economies of manufacture, will become more apparent upon consideration of the following detailed description.

DETAILED DESCRIPTION OF THE PREFERRED EMBODIMENTS

Figure 1:
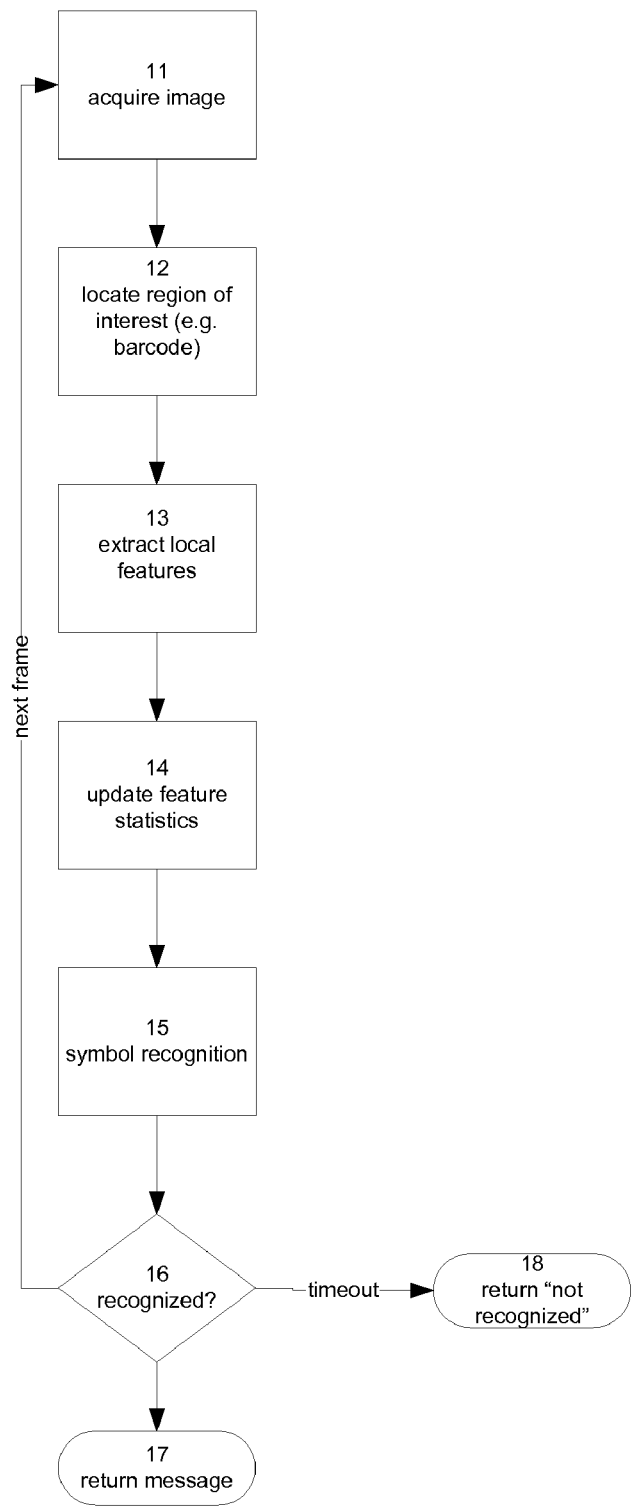
FIG. 1 is a block diagram of super-resolution barcode scanning, according to the invention.

A computer method implementation of the invention is described with reference to FIG. 1 which gives an overview. Details are then discussed and clarified. First, the image data of a single image frame is acquired in step 11 from a multi-frame video stream, live from video RAM, from previously stored image files, or from a movie file. The described algorithm is based on image intensities and does not require color. It is assumed the image frame contains an image of a quadrilateral barcode symbol, either 1-dimensional (1D) or 2-dimensional (2D), whose corners are located in step 12. Next, local features of the barcode are computed in step 13 based on the intensity information in the image data. The process maintains a statistical description of feature occurrences in memory and these statistics are updated in step 14 according to features found in the current frame. Symbol recognition in step 15 classifies each barcode bit as either 0 or 1 based on feature statistics and—if the barcode is decoded successfully (step 16)—returns the data string (step 17) encoded by the barcode. If decoding is not successful, the process continues with the next image (starting from step 11), integrating information over time. Thus, with successive image frames, information about the barcode is accumulated. The feature estimates improve and so does the probability for a successful decode. Also, a timer (implemented by a frame counter) is associated with the decoding loop, depicted in FIG. 1, to allow the process to terminate (step 18) after a predetermined period of time if decoding is not successful.

Barcode localization, according to the invention, employs an efficient subpixel-accurate search algorithm. It is this subpixel-accurate localization scheme which allows for estimating barcode bit values at a higher resolution than that available in the image data itself. It thus allows for the recovery of image detail from multiple frames not available in each single frame taken by itself. This invention can therefore be categorized as a multi-frame super-resolution computer vision algorithm. For efficiency, it leverages special properties of the quadrilateral target object as well as prior knowledge about constant patterns in the barcodes of interest (e.g. localization patterns, alignment patterns, timing patterns and any other form of barcode template). This allows for real-time implementations on portable devices such as camera-equipped cell phones where super-resolution helps to overcome some of the typical camera resolution and processing power constraints.

Figure 2:
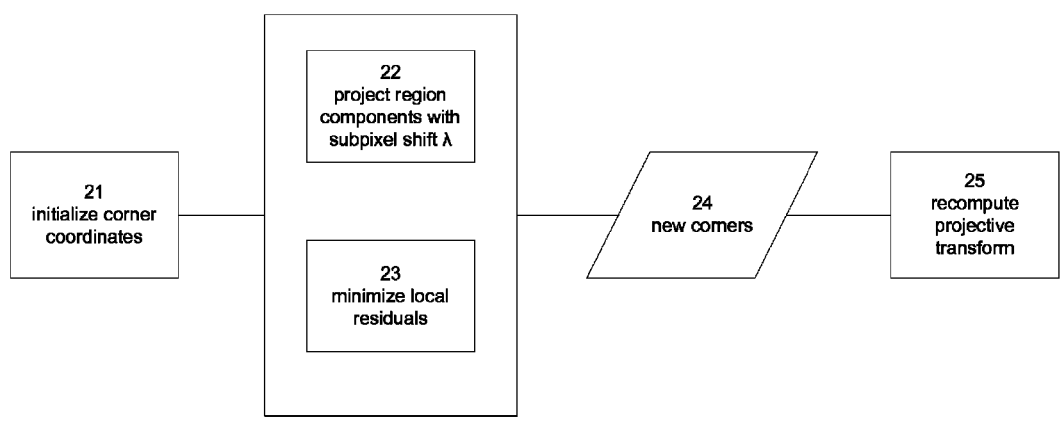
FIG. 2 is a block diagram of the subpixel-accurate localization process, according to the invention.

The subpixel localization according to the invention is detailed in FIG. 2 and focuses on the four corners of the quadrilateral target (barcode). Accurate localization is of utmost importance as small coordinate shifts in low resolution image data will result in reading intensities from wrong locations, which essentially means reading random noise.

Figure 6:
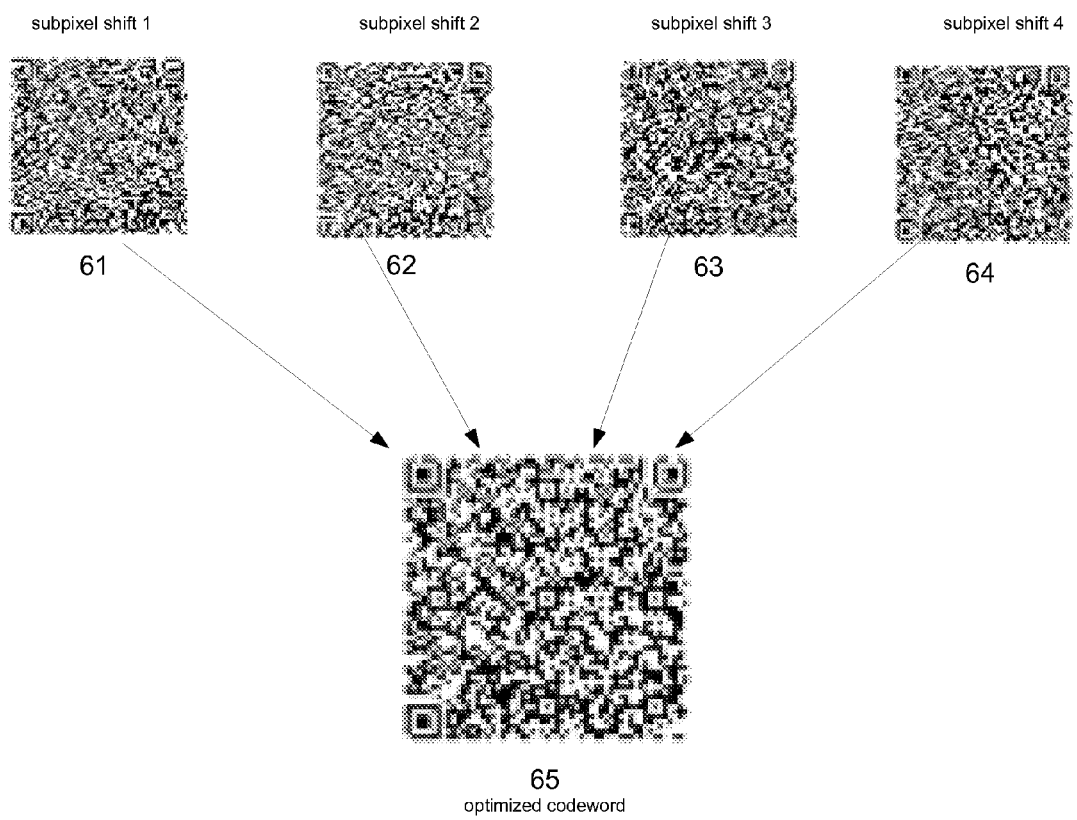
FIG. 6 is a flow chart, with accompanying images, for illustrating the sub-pixel registration process according to the invention.

Starting from a set of coarse corner coordinates (step 21) the space of adjacent coordinates on a sub-pixel scale is searched (step 22). FIG. 6 shows an example of a QR code sampled with four different subpixel shifts (61-64) resulting in four independent candidate codewords. In the actual implementation, only the template components of the QR code are projected to further reduce the number of necessary computations. To evaluate the new fit, process 23 computes the residual error $\delta_t$ between barcode-specific templates $\tau_t$ (the index t enumerates different code symbologies like QR, Data-matrix, EAN etc) and the warped image data $A(\vec{x})$. It is important to understand that $\vec{x}$ represents orthoframe coordinates, which in the 2D barcode case are bound by the number of rows and columns of the barcode, independent of the underlying image resolution.

$$\delta_t(\vec{x}) = \sum_{\vec{x}} |\tau_t - A(\vec{x})|$$

Minimizing the residual error (i.e. template registration) corresponds to optimizing corner coordinates for different subpixel shifts $\vec{\lambda}$ relative to the coarse corner coordinates $\vec{x}_0$.

$$\arg\min_{\vec{\lambda}} \delta_t(\vec{x}_0 + \vec{\lambda})$$

The residual $\delta_t$ serves also as a means to distinguish between different symbologies t. If corner templates are available (as is the case for example for QR codes), each corner can be optimized independently. Using this form of "local residuals" makes the search much more efficient. The search terminates either when the predefined space has been exhaustively searched (a predefined range vector on $\vec{\lambda}$) or if a predefined residual value has been met. The optimized coordinates ("new corners" in step 24) are then used to recompute the projective transform A (step 25). FIG. 6 shows the sampled codeword 65 after coordinate optimization. For comparison, the original codewords 61-64 exhibit an error rate of about 20% whereas the optimized codeword 65 only has a 10% error rate $\vec{x}$.

Figure 3:
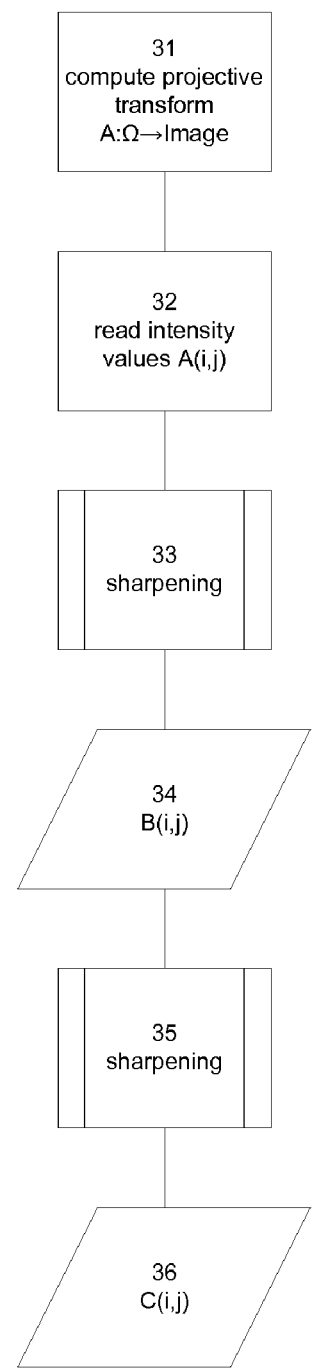
FIG. 3 is a block diagram of the feature extraction process, according to the invention.

As shown in FIG. 3, the computed projective transform (step 31) is applied at each bit position i, j to read image intensity values A(i, j) in step 32. These intensities are contrast enhanced using sharpening. Two successive sharpening steps 33 and 35 yield feature matrices B(i, j) in step 34 and C(i, j) in step 36. The proposed invention implements sharpening using a 2D convolution kernel. Original intensities as well as sharpened versions thereof (matrices A, B and C) are the extracted information on which the classification of individual bits will be based.

Figure 4:
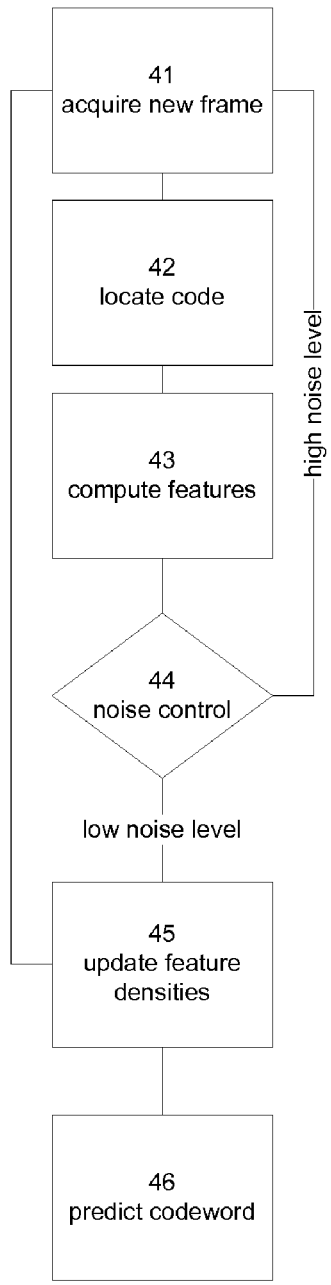
FIG. 4 is a block diagram of the temporal integration and bit classification process, according to the invention.
Figure 8:
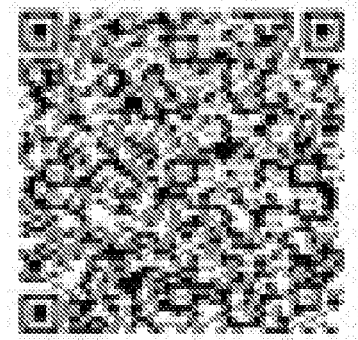
FIG. 8 is a series of images showing examples of code symbologies and corresponding localization templates.
Figure 8:
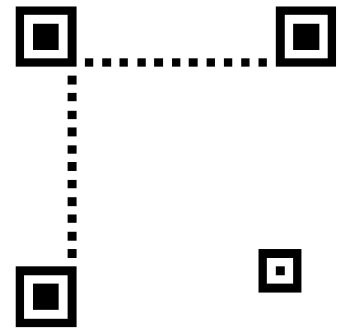
Figure 8:
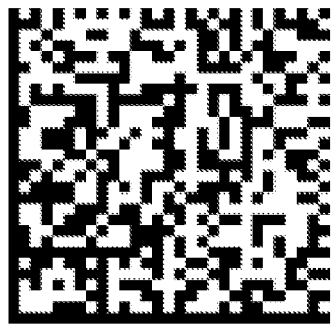
Figure 8:
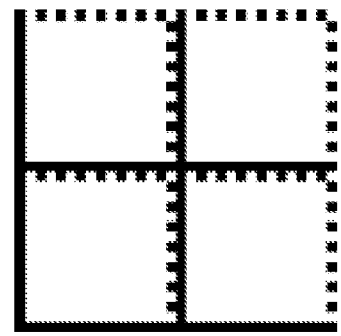
Figure 8:
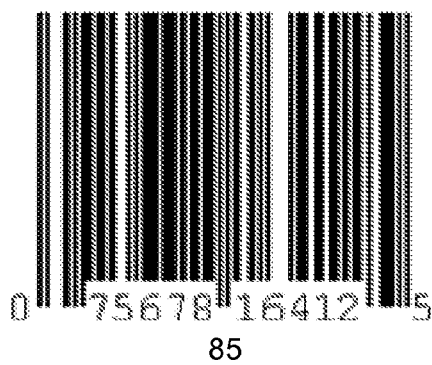
Figure 8:
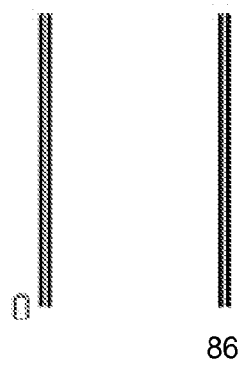
Figure 9:
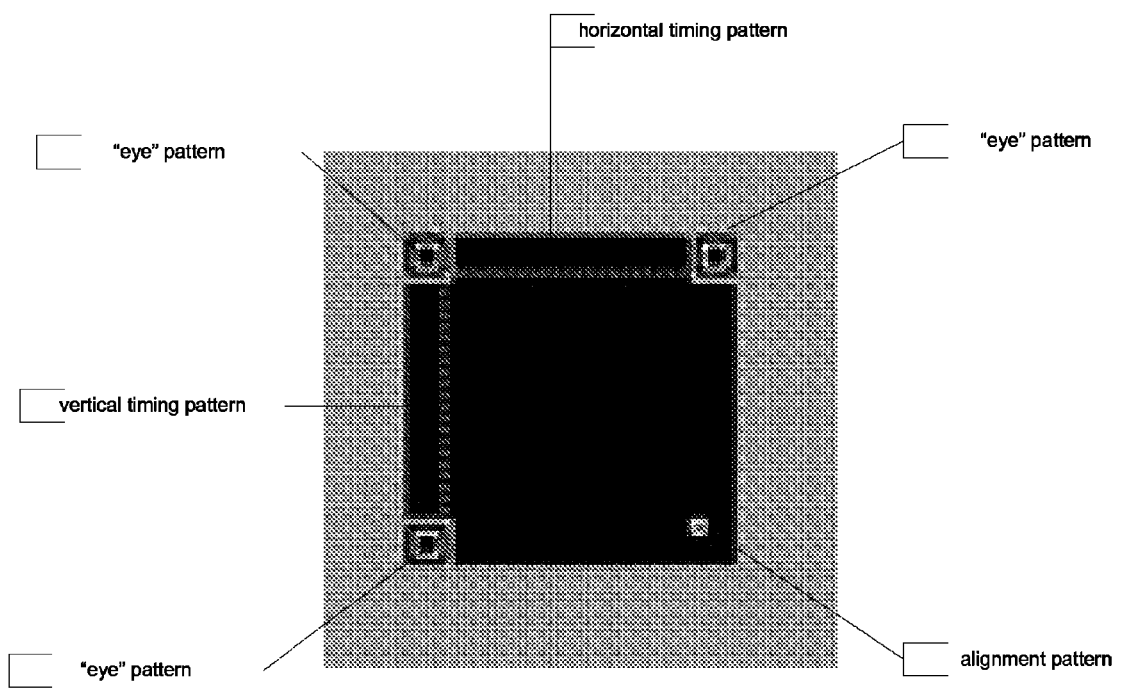
FIG. 9 is a schematic diagram of the sub-components of an example localization template.

A critical mechanism according to this invention is the noise control step in the temporal multi-frame integration as depicted in FIG. 4. The noise control step 44 decides whether or not the located and extracted codeword (42/43) from the current frame (step 41) is incorporated into the feature statistics (step 45). The key insight here is that only high quality information will improve the codeword prediction (step 46). This is also because in practice a relatively small number of independent frames is considered for the task: about 5 to 20 frames, because at low frame rates which are typical of handheld devices, additional frames mean more time for the user waiting for feedback which deteriorates overall user experience. Further, the a priori distribution of high quality versus low quality frames in the video stream is unknown, so no assumptions can be made here. Omitting a given frame altogether might be necessary if it is contaminated with too much noise, originating for example from out-of-focus blur, from motion blur, from (partially) under-exposed or over-exposed image data, shadows, glare, specularities etc. Equally, in the case of inaccurate localization in step 42 the extracted information will be overly noisy and would actually harm codeword prediction (step 46). Similar to the subpixel-localization step 42, the noise level is estimated in step 44 by evaluating the error residual with respect to a barcode template. These templates are barcode dependent and examples are shown in FIG. 8 for the QR code (81/82), Datamatrix (83/84) and the UPC-A barcode (85/86). Local residuals for QR codes are illustrated in FIG. 9. For efficiency, the previous results from step 42 can be reused here. The actual codeword quality $\tilde{q}$ s estimated based on a linear regression (with regression coefficients $\vec{r}$) of local template error residuals $\vec{\delta}$.

$$\tilde{q} = \vec{r} \cdot \vec{\delta}'$$

Figure 7:
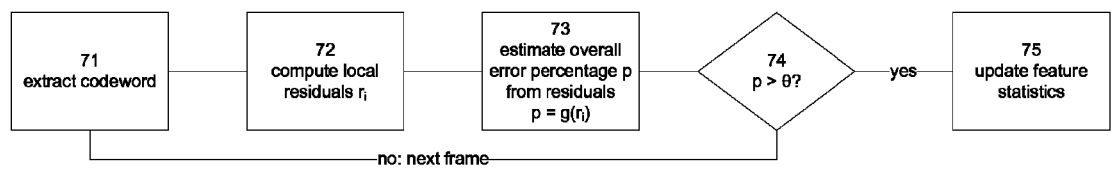
FIG. 7 is a block diagram of the noise control process, according to the invention

Noise control is further detailed in FIG. 7. The overall error in step 73 is estimated from the vector of local residuals of step 72 (linear mapping). If the result exceeds a previously "learned" threshold (in the machine learning sense) in step 74 the codeword is rejected and the next frame is considered (step 71). Otherwise the codeword is added to the feature statistics in step 75.

The linear estimator is learned beforehand from a set of training examples with measured template residuals. We employ supervised learning with ground truth in form of the actual error percentage of a training instance codeword. The regression coefficients $\vec{r}$ can then be computed with standard least-squares techniques. Coefficients represent the weight or importance of individual template components. In particular, zero or close-to-zero coefficients indicate that the associated template component is irrelevant. The learning thus serves as a form of feature selection. The parametric form of the estimator is linear because it was found empirically to be both sufficiently accurate and fast to compute (simple dot-product).

Figure 5:
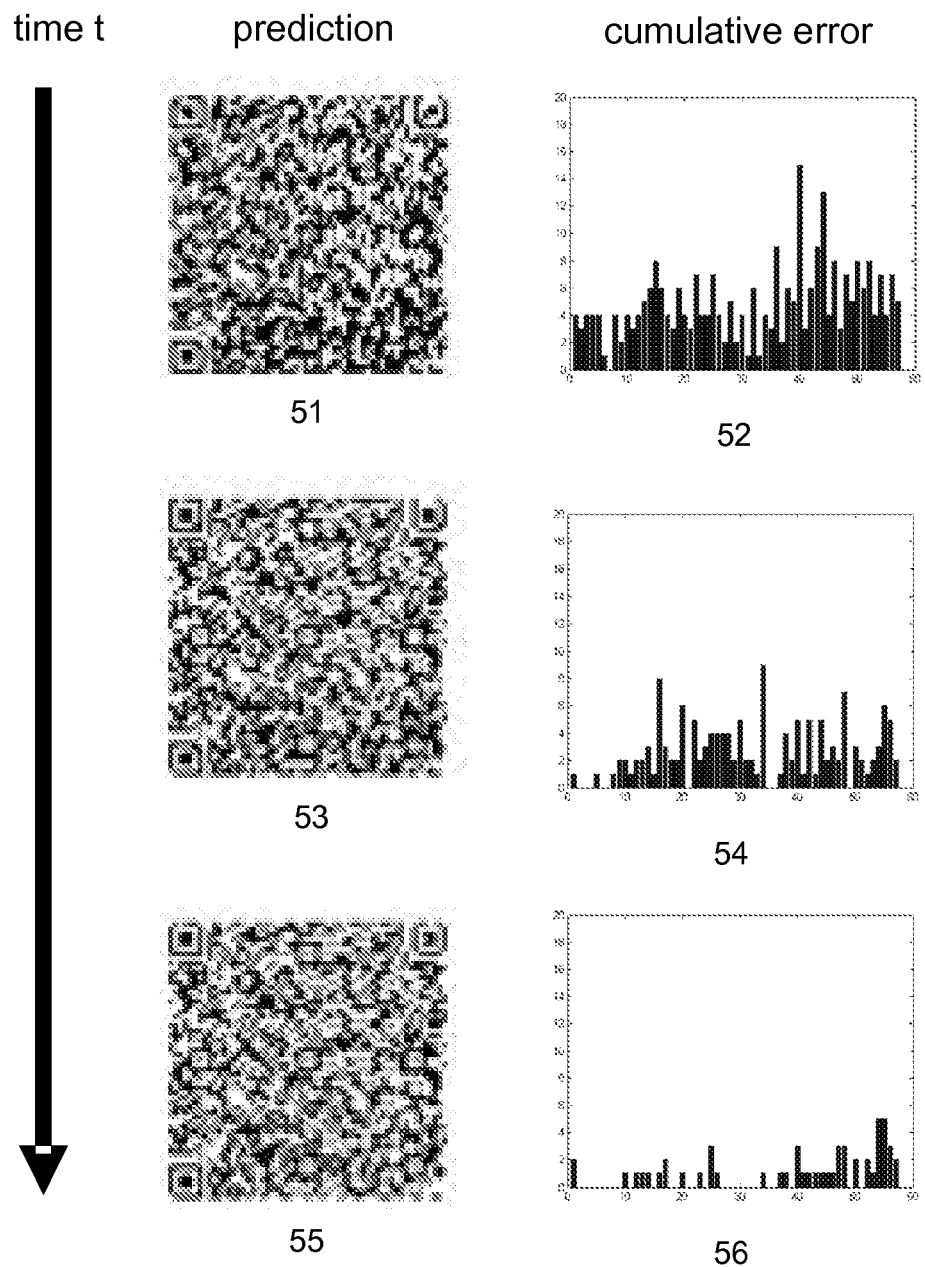
FIG. 5 is a flow chart, with accompanying images, for illustrating an error reduction process according to the invention.

The effect of multi-frame integration on the cumulative codeword error according to the invention is illustrated in FIG. 5. The example shows codeword prediction for a QR code. The predicted codeword from the first image frame (label 51) has about 90% of bits correct, not enough though to be successfully decoded. The cumulative error shown by graph 52 reflects the number of bit errors in each column of the codeword. Errors were determined in this illustration by comparing to ground truth. With successive frames yielding high quality codewords (53 and 55) the cumulative error is continuously driven towards zero and falls below 2% in codeword 55.

Figure 10:
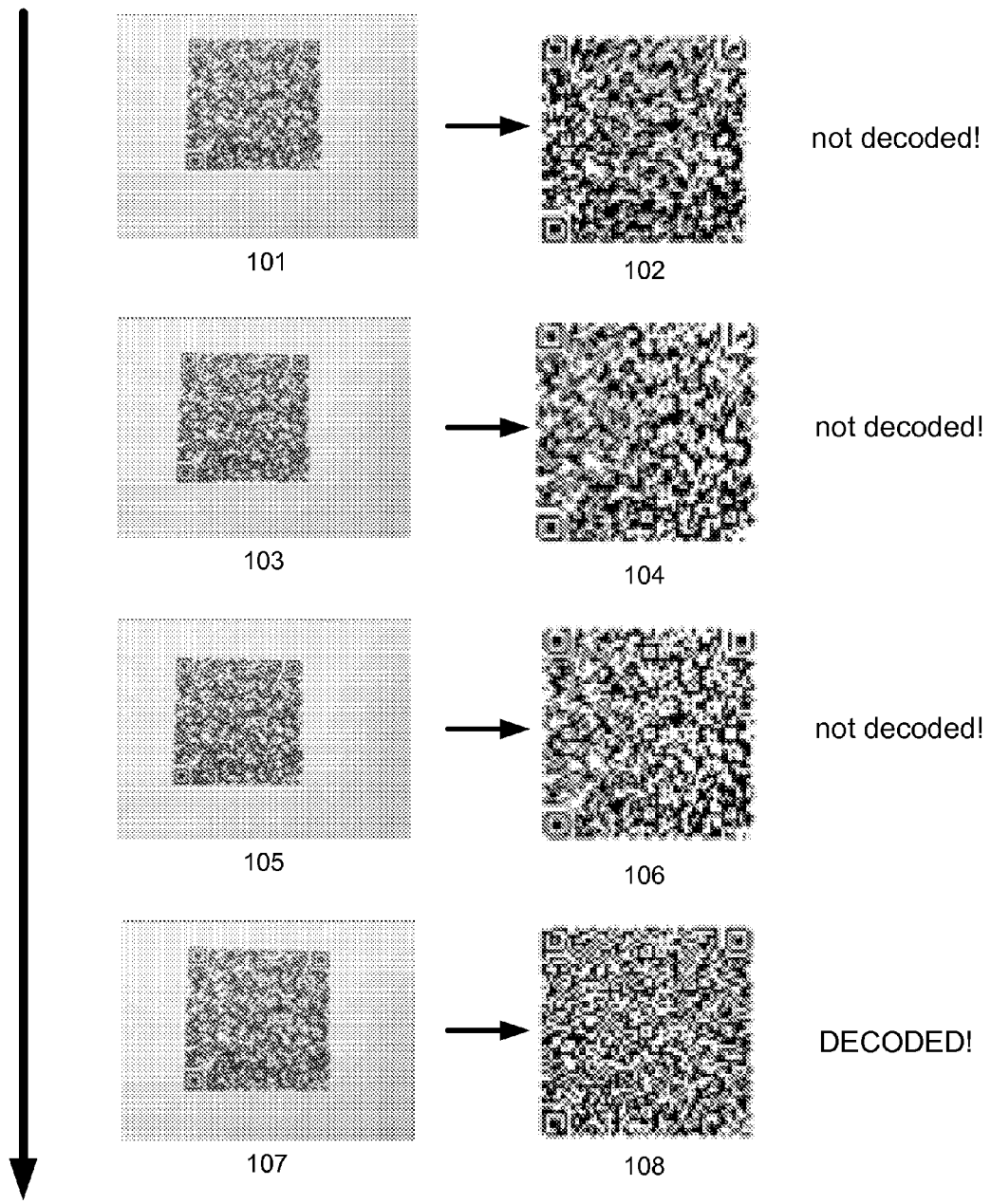
FIG. 10 a series of images of input frames, the extracted codewords, the predicted codewords over time, and the decoding results according to this invention.

FIG. 10 relates the actual input frames (101,103,105,107) to the predicted codewords (102,104,106,108) and also shows the decoding status on the right-most column. It must be emphasized here that none of the individual frames allow for decoding. Only their combination through the method as detailed in this invention allows for recovering sufficient barcode detail for successful decoding (108).

Figure 11:
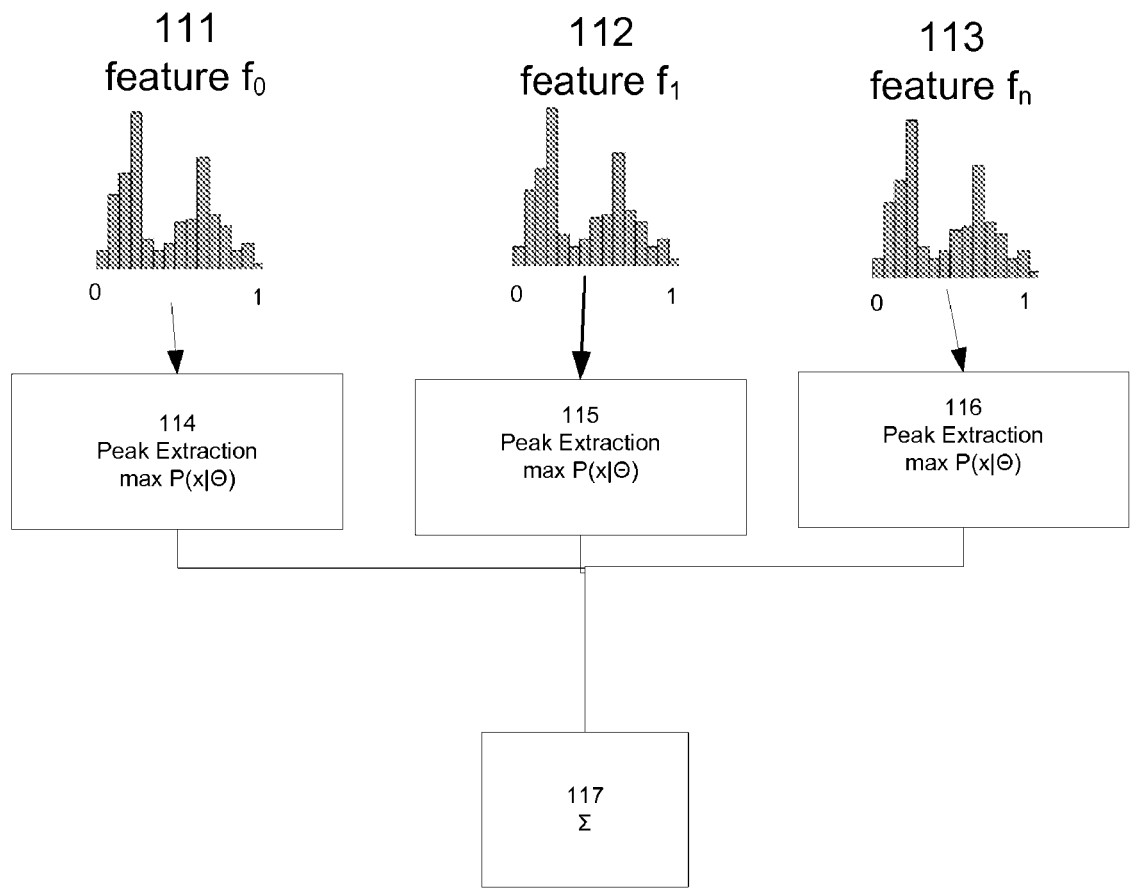
FIG. 11 is a diagram showing the prediction process based on counting density peaks.
Figure 12:
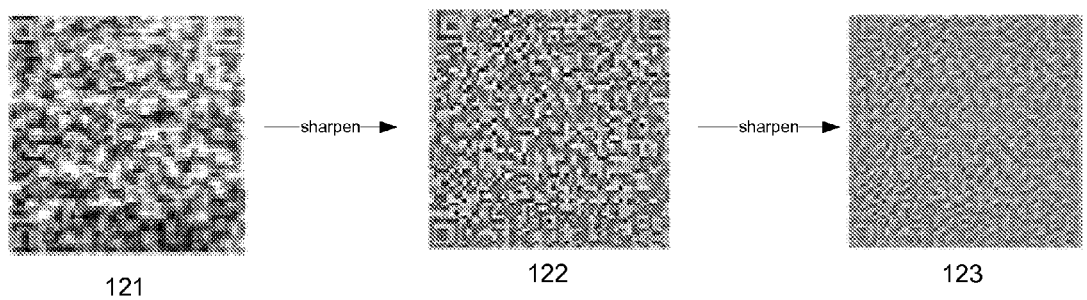
FIG. 12 is a series of images visualizing the extracted codeword features and successive sharpening results.

Codeword prediction is illustrated in FIG. 11 and FIG. 12. The schematic sketch in FIG. 11 gives a more detailed account of the codeword prediction process. Feature values of n features $f_0 \ldots f_n$ marked 111-113 in FIG. 11 are binned into histograms which approximate their likelihood $p(f_i|\theta)$ (where p denotes the density function). For efficiency we seek to minimize the number of features that need to be evaluated and modeled. The implementation according to this invention uses n=3 features, namely the original intensities A(i,j) where i, j are orthoframe coordinates and the sharpening results B(i, j) and C(i, j). All feature values are normalized to the range [0;1]. Assuming equal prior probabilities we decide on an individual bit value given one particular feature $f_i$ according to where the peak in the density occurs $$\text{bit}=1 \Leftrightarrow \max p(f_i|\theta) > 0.5$$

The maximum frequency count (we employ histograms for density modeling) is determined for each feature histogram to obtain each feature's hypothesis $h_i$ for a barcode bit being either 0 or 1 (steps 114-116). These hypotheses are then accumulated in step 117 and the final bit value $\tilde{h}$ is predicted based on voting with uniform weights:

$$\tilde{h} = \Sigma h_i > \lfloor n/2 \rfloor$$

In probabilistic terms, this can be interpreted as a Naïve Bayes integration of the log-likelihoods, which is well-known for its noise tolerance.

FIG. 12 shows examples of feature matrices A, B and C (121-123). The overall goal is to use only few features which capture enough information to predict bit values accurately and with the least amount of image frames possible (minimum user wait time).

Figure 13:
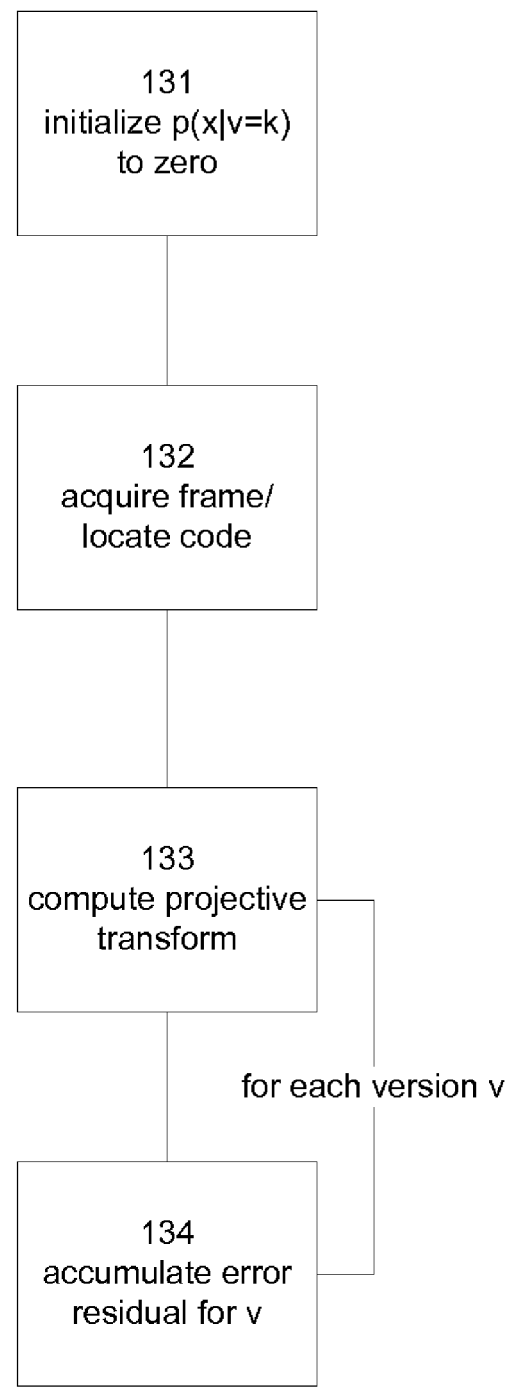
FIG. 13 is a block diagram of version number estimation for QR-codes.

For parameterized barcodes of variable complexity such as QR codes and Datamatrix codes, the barcode parameters need to be recovered first before the entire codeword can be examined. This is done by a version estimation process as illustrated in FIG. 13. The term "version" refers specifically to the QR code which is taken as an example here, and which defines the number of rows and columns in the code matrix (codeword dimension). In the case of QR barcodes this number is related to the number of bits per row m ("orthoframe dimension")

$$v = \frac{m - 17}{4}$$

Figure 14:
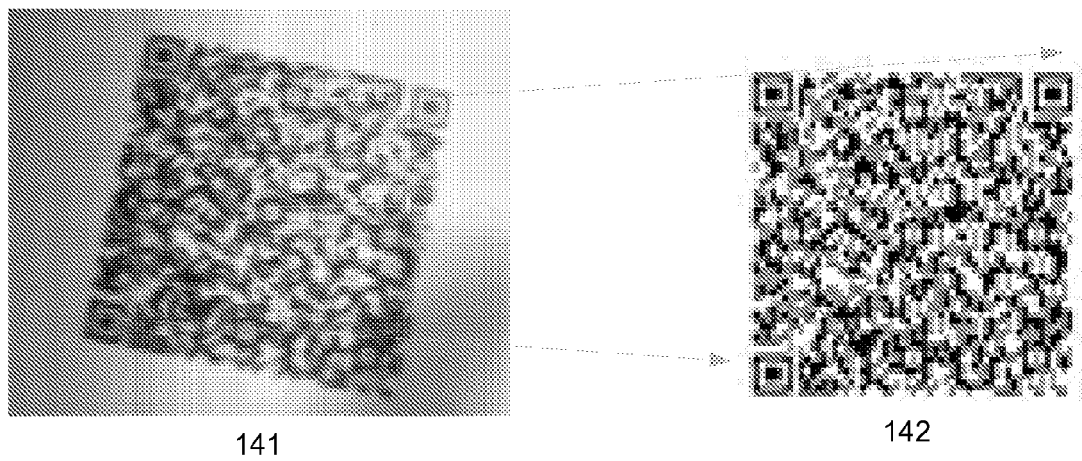
FIG. 14 is a schematic drawing of the projective transformation of image pixels to the orthoframe.
Figure 15:
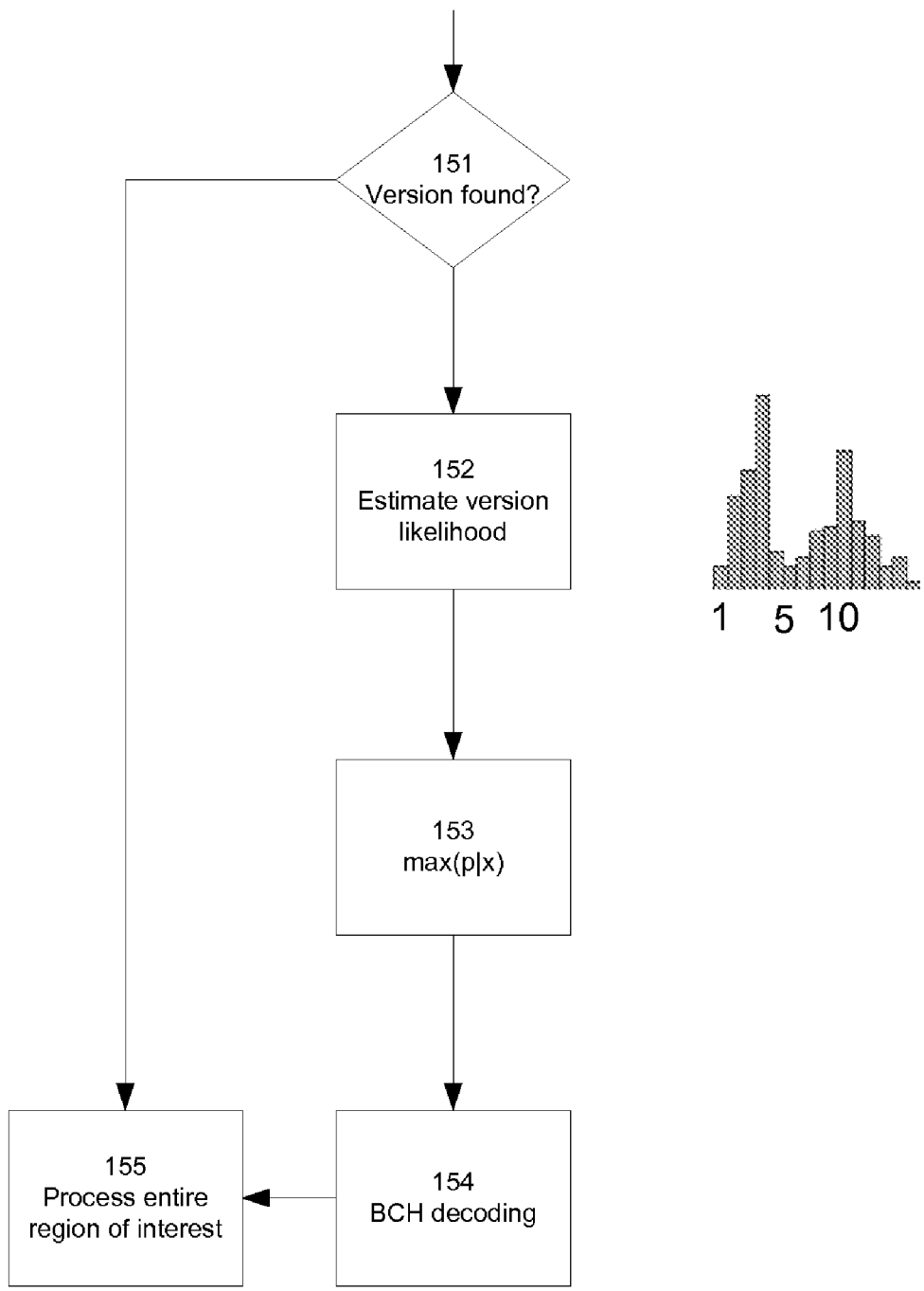
FIG. 15 is a block diagram of version number locking.

The general idea here is to recover the version number v first and then to start estimating all other bits in the codeword. It is possible that v can be recovered from the very first image frame already, but it is also possible that a number of frames need to be evaluated first before codeword prediction is initiated. FIG. 13 shows the version estimation process, which follows the principles of codeword prediction as described in this invention. The proposed method maintains a probability distribution over the set of possible version numbers initialized to zeros (step 131). After the codeword has been localized in the current image frame (step 132) a projective transform to an orthoframe is computed. The projection handles in-plane and out-of-plane rotation as well as translation and scaling (illustrated in FIG. 14). The projection is applied for different orthoframe dimensions m, and each time the projection result is then compared to a barcode template (analogous to the description of FIG. 7). The minimum residual gives rise to the most likely version number, that is, it is anti-proportional to the likelihood $p(x|v=k)$ where x relates to the residual conditioned on one particular value k for the version number v. The probability density over all version numbers is stored in memory and updated with successive frames (step 152) and as it becomes more and more accurate over time, the true version number is eventually recovered (step 153). In the particular case of QR barcodes we use the BCH-encoded version string as a secondary cue in version number recovery (step 154). Once the BCH string has been successfully decoded the version number is not further examined (step 151).

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

What is claimed is:

1. A method for real-time recovery of barcode features from a plurality of image frames, comprising:
   (a) obtaining a first image frame from the plurality of image frames, wherein the plurality of image frames include a barcode;
   (b) detecting four-corner coordinates of the barcode in the first image frame using at least one corner template;
   (c) detecting a set of barcode features of the barcode based on image intensities;
   (d) estimating a noise level of the detected set of barcode features using at least one barcode template;
   (e) if the estimated noise level is not greater than a predetermined threshold level, collecting statistical information of the set of barcode features, wherein statistical barcode data is generated from accumulating the collected statistical information;
   (f) determining whether the set of barcode features can be decoded based on the statistical barcode data;
   (g) if it is determined that the set of barcode features cannot be successfully decoded based on the statistical barcode data, repeating (a)-(g) for a next image frame in the plurality of image frames; and
   (h) if it is determined that the set of barcode features can be successfully decoded based on the statistical barcode data, decoding the set of barcode features to extract information encoded in the barcode, wherein the set o of barcode features could not be decoded from any one individual image frame in the plurality of image frames.

2. The method of claim 1, wherein the four-corner coordinates of the barcode are detected using a subpixel-accurate search algorithm.

3. The method of claim 1, wherein the barcode is one of one-dimensional barcode and two-dimensional barcode.

4. The method of claim 1, wherein the statistical information of the barcode features includes nonparametric histogram.

5. The method of claim 4, wherein determining whether the set of barcode features can be decoded is based on histogram peaks in the nonparametric histogram.

* * * * *